United States Patent Office 3,372,620
Patented Mar. 12, 1968

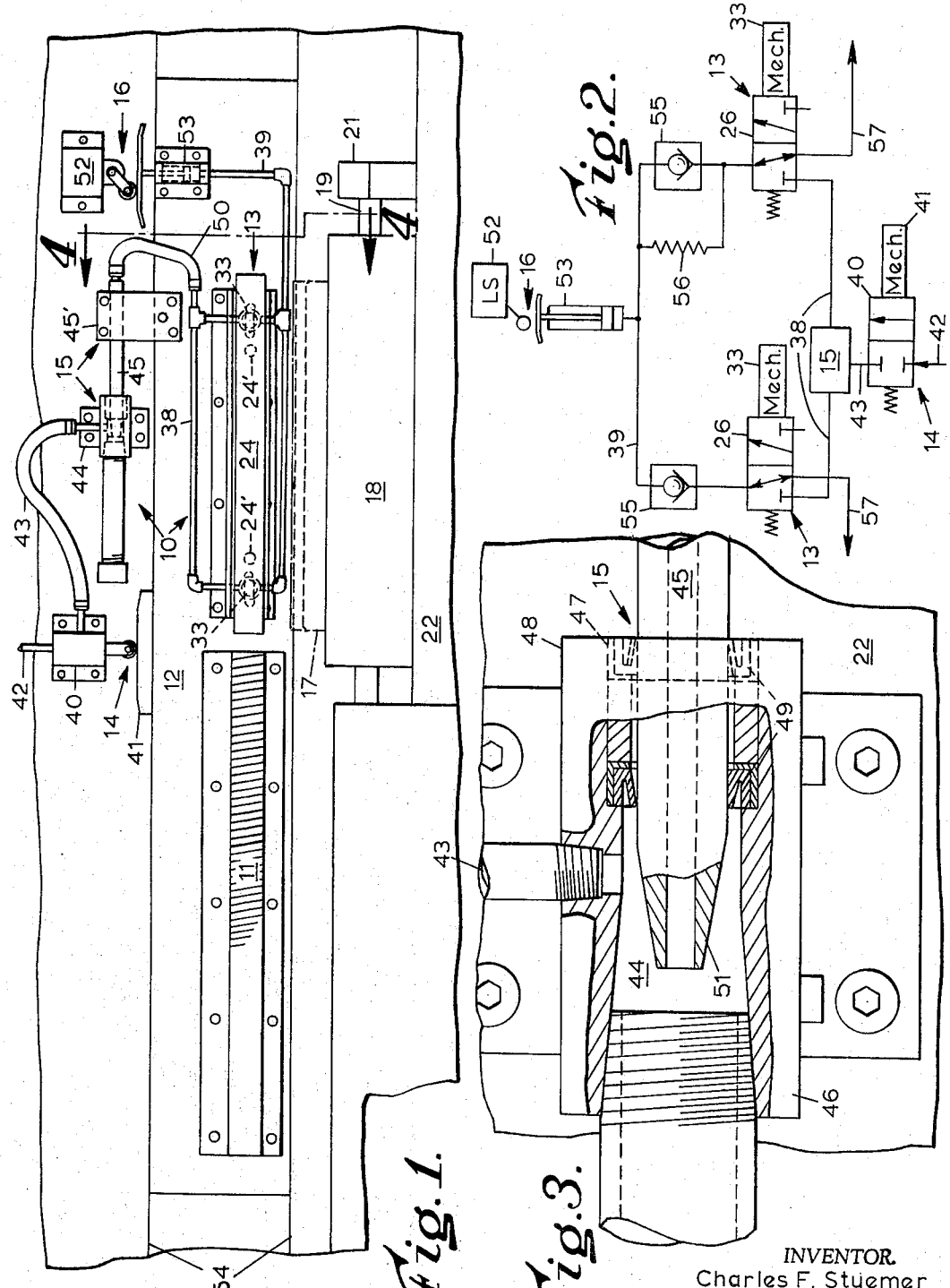

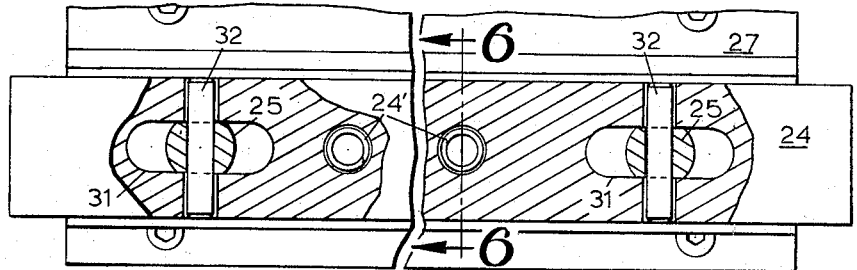
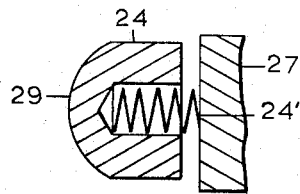
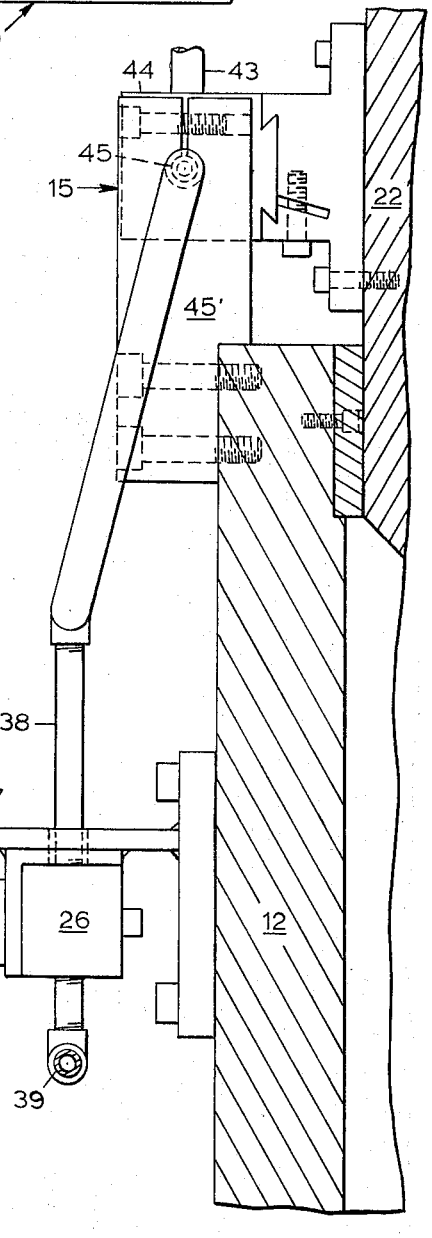
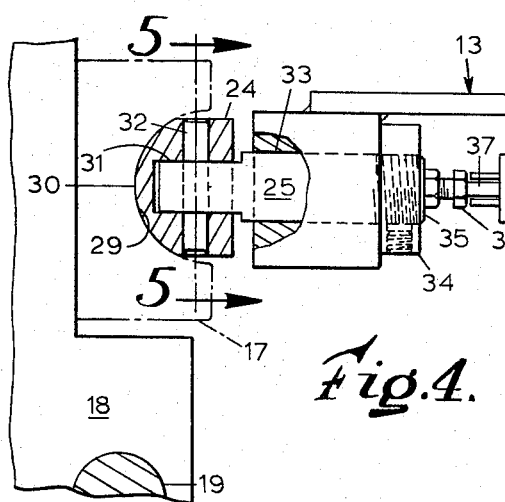

3,372,620
INTERFERENCE DETECTION MECHANISM FOR MACHINE TOOLS
Charles F. Stuemer, Cincinnati, Ohio, assignor to The Cincinnati Milling Machine Co., a corporation of Ohio
Filed Mar. 25, 1966, Ser. No. 537,505
4 Claims. (Cl. 90—66)

This invention relates to automatic machinery and more particularly to automated broaching machines such as are used extensively in the automotive industry and other high volume metalworking industries.

It is an object of this invention to provide the moving slide of a machine tool with a mechanism that is operable when the slide is at a predetermined position to detect excessive interference between a cutting tool and the work intended to be cut whereby automatic machine cycling is interrupted until the interference is eliminated, thus preventing excessive damage to expensive tools and eliminating scrapped workpieces that would otherwise result from excessive irregularities in unfinished workpieces such as rough castings.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

This invention employs a mechanism carried on that machine slide which provides relative movement between the cutting tool and workpiece during a cutting cycle. In its preferred form the slide is movable in a reciprocating manner and when it is at one end of its stroke, a new workpiece is presented to the machine after removal of the finished workpiece. At this time a coupling unit included with the detecting mechanism connects power for actuation thereof and means are also provided when the slide is in this position to transmit an interference signal from a detection mechanism on the slide to the machine cycle control circuitry whereby automatic cycling is stopped if an interference is sensed. Therefore the detecting mechanism is active only when a new workpiece is first presented to sense its critical surfaces and to stop the machine cycle if necessary. If no excessive interference is present, the slide moves in a normal automatic cycle and the detection mechanism is deenergized and completely disconnected from the machine cycle control apparatus thereby eliminating any movable power and signal transmission connections between the slide and the other machine parts. Preferably, the detecting mechanism is pneumatically actuated so that the connection of air under pressure to the mechanism is provided by the coupling unit and a control valve is included in the pressurized air supply, this valve being opened in time with the movement of the slide to the one end of its stroke.

A clear understanding of the construction and operation of this invention can be obtained from the following detailed description in which reference is made to the attached drawings wherein:

FIG. 1 is a partial front view in elevation of a horizontal broaching machine.

FIG. 2 is a schematic showing of the pneumatic circuit of the apparatus.

FIG. 3 is an enlarged view, partly in section, of a portion of the apparatus shown in FIG. 1.

FIG. 4 is a section view of the apparatus of FIG. 1 taken on line 4—4 thereof.

FIG. 5 is a detailed showing, partly in section and enlarged, of a portion of FIG. 1.

FIG. 6 is a detailed showing in section of the apparatus of FIG. 5 taken on line 6—6 thereof.

The interference detection apparatus of this invention, generally referred to in FIG. 1 by the reference numeral 10, is shown as used in a specific application with a broaching tool 11 that is reciprocally movable with a ram 12 of a horizontal broaching machine. The interference detection apparatus 10 is comprised of elements including a probe unit 13, a pressurized air control valve unit 14, an air coupling unit 15, an interference signal unit 16 and interconnecting circuit elements shown in FIG. 2.

In the broaching machine shown, a workpiece 17 is clamped by conventional fixture means (not shown) on a work carriage 18 which can be swung upward from the horizontal loading position shown in FIG. 1 to the vertical machining position shown in phantom in FIG. 4. This swinging movement takes place about a shaft 19 extending through the work carriage 18. The shaft 19 is journaled at one end in a trunnion 21 mounted on a machine base 22 and at the other end in an angular drive mechanism included in the base 22. The work carriage 18 is latched in the vertical position by a mechanism (not shown) independent of the mechanism which swings it upward so that the separating forces produced during a cut are not transmitted through the shaft 19 and so that the workpiece 17 is held fixed in relation to the base 22 during a cutting operation. Thus, it is seen that the detecting mechanism is combined in a conventional horizontal broaching machine wherein the slide and base comprise a pair of relatively movable members that effect the work done.

In order to show the probe unit 13 more clearly, the workpiece 17 and the work carriage 18 are shown in the loading and unloading position and the ram 12 carrying the broach 11 is shown in the retracted position in FIG. 1. The carriage 18 and workpiece 17 are shown in FIG. 4 in the vertical or machining position wherein an interference detection test takes place just prior to the stroking of the ram 12 in a cut.

The probe unit 13 comprises a sensor in the form of a probe bar 24, two plungers 25 holding the bar 24, two normally closed air valves 26 and a supporting bracket assembly 27 which is fixed in place on the face 28 of the ram 12. The probe bar 24 is slightly longer than the workpiece 17 and has a face 29 designed generally to conform to the rough surface 30 of the workpiece 17 which is to be broached. FIGS. 4 and 5 show the method of mounting the probe 24 on the plungers 25. It is shown that the probe 24 is retained vertically on the plungers 25 by slots 31 in the probe 24 and horizontally by pins 32 which are fitted tightly in the plungers 25 and loosely fitted in the probe 24. Each of the plungers 25 is reciprocably mounted in a bore 33 in the bracket 27 and is provided with an adjustment nut 34 at its inner end 35 to limit its movement axially toward the workpiece 17. An adjustment screw 36 is provided on each of the inner ends 35 of the plungers 25 to abut the respective valve stems 37 of the pair of the valves 26. FIGS. 1, 5 and 6 show springs 24' compressed between the probe 24 and the bracket 27 to urge the probe 24 toward the workpiece 17 at all times. Since the valves 26 are suspended from the brackets 27 in axial alignment with the plungers 25, a deflection of the probe 24 inwardly at either end or along its entire length against the outward bias of the springs 24' will open one or the other or both of the valves 26 allowing pressurized air to flow, as shown in FIG. 2, from a conduit 38 into a conduit 39 through check valves 55 when the bar 24 is moved to any location within a range of positions.

The valve unit 14 comprises a normally closed valve 40 which is mounted on the machine base 22 and a cam 41 mounted on the ram 11, the valve 40 being connected in a series circuit between a source of pressurized air 42 and the air coupling unit 15 by a conduit 43. The valve 40 when opened by the engagement with the cam 41 allows air under pressure to flow from the source 42 to the coupling unit 15 through the conduit 43. This happens when the ram 12 is at or near the position in the machine in which it is shown in FIG. 1.

The air coupling unit 15 comprises a pair of female and male elements including a spacially fixed chamber 44 mounted on the base 22 and a tube 45 mounted in a bracket 45' for movement with the ram 12. The chamber 44 is closed at its rearward end 46 and has an opening 47 at its forward end 48. The opening 47 is provided with suitable annular seals 49 to prevent excessive leakage of pressurized air around the outer periphery of the tube 45 when it is inserted into the opening 47 as shown. The rearward end 51 of the tube 45 is tapered to a smaller outside diameter to facilitate entry of the tube 45 into the seals 49 when the ram returns leftward (as viewed in FIG. 1) to the retracted position. The conduit 43 is connected to the chamber 44 and the tube 45 is connected to the conduit 38 at its forward end by way of a hose 50, included with the air coupling unit 15, and therefore pressurized air is transmitted from the source 42 to the conduit 38.

The interference signal unit 16 comprises a transmitter in the form of a limit switch 52 mounted on the base 22 and an operation in the form of a pneumatic motor 53 mounted on the ram 12 for actuating the limit switch 52 to cause it to produce a signal that is transmitted to the ram motor circuit (not shown). This signal deenergizes the ram motor thereby preventing the normal automatic broaching operation. However, such an interruption of the normal broaching cycle occurs only when there is an excess of stock on the surface 30 of the workpiece 17 causing the probe 24 to be moved inwardly against the bias of the springs 24' to open the valve 26 and allow pressurized air to flow from the conduit 38 into the conduit 39 for effecting actuation of the motor 53.

In a normal broaching cycle with the workpiece 17 clamped on the carriage 18 and the carriage 18 swiveled to its broaching position, if there is no excess stock on the workpiece 17, the probe 24 will not be moved inwardly, the valves 26 will remain closed and the switch 52 will not be actuated. Then by means of conventional automatic control circuitry (not shown) the ram 12 is caused to move forwardly along ways 54 formed in the base 22 thereby moving the broach tool 11 across the workpiece 17. When the ram 12 reaches the forward end of its stroke the carriage 18 is unlatched and swung down from the broaching position to the unloading position. The workpiece 17 then is unclamped from the work carriage 18 and unloaded while the ram returns to the retracted position shown in FIG. 1 causing the cam 41 to open the valve 40 and at the same time engaging the air coupling unit 15 thereby conditioning the detector apparatus 10 for the next operation. A new workpiece 17 is then loaded and clamped onto the carriage 18 and the carriage 18 is then swung upward to the vertical or broaching position and the cycle is begun again if no excessive tool to work interference is detected. If there is an interference signaled, the cycle is stopped and cannot be restarted until the machine operator has cleared the interference.

FIG. 2 is a diagrammatic showing of the pneumatic control circuit of the described embodiment of the invention in which the same reference characters are used to denote corresponding parts shown in the mechanical drawings. Attention is directed to check valves 55 in the conduit 39 and a shunt resistance 56 around one of the check valves 55. The check valves 55 are faced so as to permit pressurized air to flow from one or both of the valves 26 into the conduit 39 but not out of it. Since the pressurized air in the conduit 39 and the motor 53 would become trapped, the shunt resistance 56 is provided to bleed the motor 53 through the valve 26 to an exhaust 57.

It is apparent from the above description that an interference detector apparatus 10 has been provided for use in conjunction with the automatically controlled broaching machine and that the unit will prevent the broaching operation from starting if there is an excess of stock on the workpiece 17 yet will allow the machine to go through its normal cycle if there is not an excess of stock on the workpiece 17. It is further apparent that the air supply to operate the detection mechanism is not complex and requires no constant connection to the moving ram 12 thus eliminating the need for long flexible air lines or linear commutators of any kind other than the relatively simple coupling unit 15 described which is used only when the ram 12 is at the retracted position. The interference signal interface between the ram 12 and the limit switch 52 in the cycle control circuitry is likewise not complex, being a simple mechanical expedient and therefore is easily adjusted and serviced and has no traveling commutation or connection problems.

What is claimed is:
1. In a machine having a pair of relatively movable members defining a base member and a slide member, one of said pair of members having apparatus for mounting a workpiece thereon for engagement with a tool fixed on the other member thereof, a mechanism for signalling excessive workpiece to tool interference before contact therebetween comprising:
   (a) a probe mechanism attached to one member of said pair having a deflectable sensor adapted to engage the workpiece when said members are in a predetermined relative position,
   (b) a power supply included in the other of said pair of members,
   (c) a coupling unit having elements received on each member of said pair, said elements adapted to mate when the members of said pair are in said predetermined relative position,
   (d) transmission means for connecting the elements of said coupling unit on the one and other of said pair, respectively, to the probe mechanism and power supply for transmission of power to said probe mechanism when the members of said pair are in the predetermined relative position,
   (e) control means for producing an interference signal when power is connected thereto, and
   (f) circuit means for connecting power to said control means from said probe mechanism when said sensor is held in a predetermined range of positions by the workpiece.
2. The machine of claim 1 wherein said control means is comprised of:
   (a) a mechanical actuator on said one member of the pair and connected by way of said circuit means to power from said probe mechanism when said sensor is held in the predetermined range of positions, and
   (b) a transmitter device on the other of said pair of members adjacent to said actuator when the members of said pair are in the predetermined relative position and operated by said actuator to produce an interference signal when power is connected to said actuator.
3. The mechanism of claim 2 wherein:
   (a) said source of power is a supply of air under pressure,
   (b) a control valve is included in said means for connecting said source of power and the elements of coupling unit on said other member of the pair,
   (c) a valve operator is fixed on said one member of the pair and contacts said control valve to effect opening thereof when the members of said pair are in the predetermined relative position, and
   (d) said coupling unit, transmission means, circuit means and mechanical actuator are pneumatic devices.

4. The mechanism of claim 3 wherein said coupling unit elements comprise:
   (a) a female member fixed onto said other member of the pair and including a chamber and fixed opening thereinto, and
   (b) a male member fixed onto said one member of the pair and inserted through said opening into said chamber when the members of said pair are in said predetermined relative position.

References Cited

UNITED STATES PATENTS 1,368,583  2/1921  Thompson.
2,064,172  12/1936  Lofstedt.

FRANCIS S. HUSAR, *Primary Examiner.*